United States Patent Office 3,028,533
Patented Apr. 3, 1962

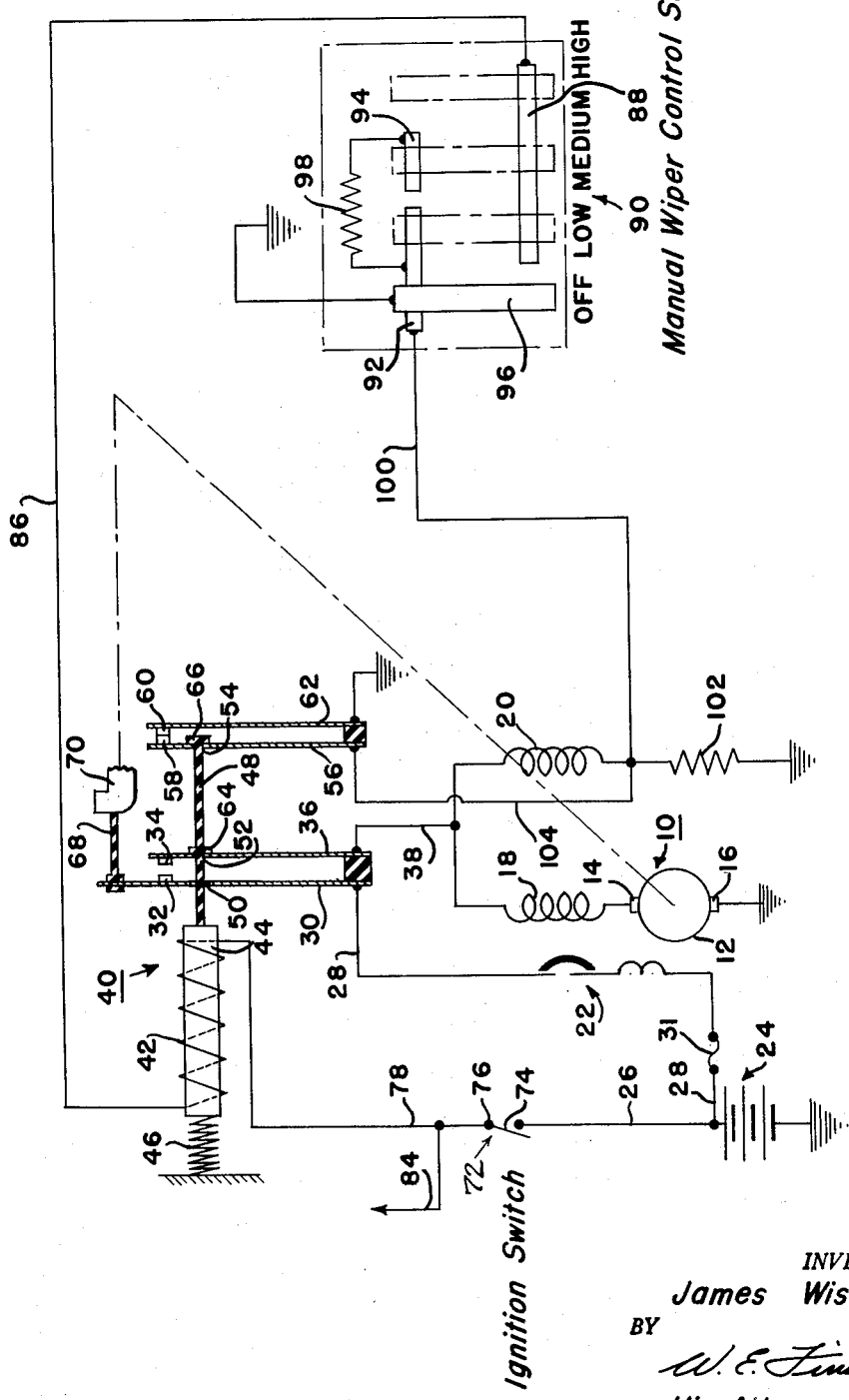

3,028,533
ELECTRIC WINDSHIELD WIPER CONTROL
James Wishart, Jr., Detroit, Mich., assignor to General Motors Corporation, Detroit, Mich., a corporation of Delaware
Filed June 19, 1959, Ser. No. 821,413
11 Claims. (Cl. 318—446)

This invention pertains to control means for electric motor operated windshield wipers, and particularly to a control circuit for automatically parking the wiper blades when the ignition circuit is opened during wiper operation.

At the present time some vehicles are equipped with windshield wipers driven by actuating mechanism including an electric motor. The actuating mechanism may include means for oscillating the wiper blades throughout a running stroke and means for moving the wiper blades to a depressed parked position outside of the running stroke when the wipers are not operating. Windshield wiper actuating mechanism of this type is disclosed in copending application Serial No. 718,789 filed March 3, 1958, in the name of Peter R. Contant et al. and assigned to the assignee of this invention.

It has been the practice to connect the control and parking switches for the electric motor driven windshield wiper unit through the ignition switch of the vehicle to make certain that the electric wiper motor will be deenergized when the ignition switch is open. This is done to prevent discharge of the vehicle battery when the ignition switch is open, and eliminate the need for the operator to manually turn the wiper control switch to the "off" position. Thus, when the ignition switch is opened with the wiper switch in the closed position, the electric wiper motor is instantly deenergized and the wiper blades are arrested within the running stroke. This may be undesirable, since if the wiper blades remain arrested within the area of running stroke for any appreciable length of time the windshield will be streaked in this area during subsequent operation. In addition, during inclement weather when the ambient temperature is below freezing the wiper blades may become frozen to the surface of the windshield within the area of the running stroke.

The present invention relates to a control circuit for automatically causing parking of the wiper blades whenever the ignition switch is opened. In other words, the wiper blades will be automatically moved to the parked position at which point the electric motor will be deenergized when either the manual wiper control switch is moved to the "off" position or the ignition switch is opened. Accordingly, among my objects are the provision of control means for electric motor actuated windshield wiping mechanism including circuit means for automatically parking the mechanism when the power supply switch is opened; the further provision of control means for a self-parking electric motor operated windshield wiper actuating mechanism including parking switch means responsive to manual operation of either of a pair of switches; and the still further provision of control mechanism for electric motor operated windshield wiper actuating mechanism including an energizing circuit connected with a wiper control switch and an ignition switch of a vehicle such that actuation of either of the switches to the "off" position will result in automatic parking of the actuating mechanism.

The aforementioned and other objects are accomplished in the present invention by incorporating a second switch in the automatic parking switch assembly and connecting the parking switch directly with the electric power source. Specifically, the disclosed circuit means is specifically designed for use with electric motor operated windshield wiper actuating mechanism of the type disclosed in the aforementioned copending application. Thus, the control circuit for the electric motor includes a manually operable wiper control switch and a relay controlled automatic parking switch. The manual wiper control switch controls the energization of the relay for actuating the parking switch from its parking position to its running position. In addition, the manual wiper control switch is used to vary the circuit connections for the motor to obtain different motor speeds. In the present invention a second pair of switch contacts are added to the automatic parking switch, the second pair of contacts being open when the relay is energized and closed when the relay is deenergized. When the ignition switch is closed, wiper operation is controlled by the manual wiper switch such that when the manual wiper switch is moved to the "off" position, the control relay is deenergized. The electric wiper motor remains energized, however, since the parking switch contacts remain closed until the wiper blades arrive at the depressed parked position, whereat they are automatically opened by a cam actuated means.

In addition, when the ignition switch is opened, or turned off, with the manual wiper switch in an "on" position, the control relay is deenergized. The parking switch contacts remain closed and complete an energizing circuit for the motor. Moreover, the second pair of switch contacts are closed to control the energizing circuit for the motor so that the motor runs at low speed. Therefore, the actuating mechanism will automatically move the wiper blades to the depressed parked position, and when the blades arrive at this position the motor will be automatically deenergized.

Further objects and advantages of the present invention will be apparent from the following description, reference being had to the accompanying drawing, wherein a preferred embodiment of the present invention is clearly shown.

In the drawing:
The drawing is an electrical schematic depicting the circuits for controlling the electric motor operated windshield wiper actuating mechanism.

With particular reference to the drawing, the control circuit for the electric motor operated windshield wiper actuating mechanism includes a compound wound direct current electric motor generally designated by the numeral 10 having an armature 12. The armature 12 includes a conventional commutator which is engaged by brushes 14 and 16. The brush 16 is shown connected to ground, and brush 14 is connected to one end of a series field winding 18. The other end of the series field winding is connected to one end of a shunt field winding 20. The motor 10 is of the unidirectional type and is equipped with a conventional thermal overload switch 22 which is electrically connected with the motor, in a manner to be described, so that the total motor current flows through the overload switch 22.

The motor 10 is adapted to be energized from a source of direct current power, such as a vehicle battery indicated by numeral 24. One terminal of the battery is connected to ground, and the other terminal of the battery is connected to an ignition feed wire 26 and a feed wire 28 for the electric motor 10 having a fuse 30 connected therein. The feed wire 28 is connected through the thermal overload switch 22 to a leaf spring 30 having a contact 32 constituting one of the parking switch contacts. The parking switch contact 32 is engageable with a second parking switch contact 34 carried by a leaf spring 36 which is connected to a wire 38. The wire 38 connects with the ends of both the series field winding 18 and the shunt field winding 20.

Contacts 32 and 34 carried by leaf springs 30 and 36, respectively, constitute part of a relay controlled automatic parking switch designated generally by the numeral 40. The relay controlled automatic parking switch 40 includes a relay coil 42 for controlling the position of an armature 44. When the relay coil 42 is deenergized, the armature 44 is moved to the position shown in the drawing by means of a spring such as indicated by numeral 46. The armature 44 has an actuator bar 48 composed of insulating material attached thereto. The actuator is shown schematically as extending through an opening 50 in the leaf spring 30, an opening 52 in the leaf spring 36 and an opening 54 in a leaf spring 56. The leaf spring 56 carries a contact 58 engageable with a contact 60 carried by a leaf spring 62.

The actuator bar 48 is shown schematically as including a shoulder 64 engageable with the leaf spring 36 and a shoulder 66 engageable with the leaf spring 56 so that the actuator bar 48 has a lost motion connection with the leaf springs 36 and 56. That is, the actuator bar 48 only imparts movement to the leaf springs 36 and 56 when the armature 44 moves to the left, as viewed in the drawing.

The leaf springs 30 and 36 are inherently resiliently biased towards each other, as are leaf springs 56 and 62. Accordingly, when the relay coil 42 is deenergized, so that the armature 44 is in the position depicted in the drawing, the contacts 58 and 60 carried by leaf springs 56 and 62, respectively, will be in engagement. Similarly, contacts 32 and 34 carried by leaf springs 30 and 36, respectively, will be biased into engagement until leaf spring 30 is moved to the left through a second actuator bar 68 composed of insulating material which is attached to the end of the leaf spring 30. The actuator bar 68 is moved to the left, as viewed in the drawing, through motor driven cam actuated means including a latch arm 70. The end of the latch arm 70 only operates the actuator 68 when the wiper blades are moved to their predetermined depressed parked positions.

Upon energization of relay coil 42, the armature 44 is moved to the left whereupon the actuator 48 through the shoulder 64 moves the leaf spring 36 towards the leaf spring 30 so that contacts 32 and 34 will be in engagement. At the same time, the actuator bar 48 through shoulder 66 deflects the leaf spring 56 to the left so as to separate contacts 58 and 60. The contacts 32 and 34 will be maintained in engagement with each other at all times when the relay coil 42 is energized irrespective of the position of the latch arm 70. In addition, the contacts 32 and 34 will remain in engagement upon deenergization of the relay coil 42, since the leaf springs 30 and 36 are inherently biased towards each other, until the latch arm 70 engages the actuator 68 and deflects the leaf spring 30 to the position shown in the drawing. However, contacts 58 and 60 carried by leaf springs 56 and 62 will immediately engage upon deenergization of the relay coil 42.

The ignition feed wire 26 is shown schematically connected to a single pole, single throw ignition switch 72. Contact 74 of the ignition switch is engageable with a stationary contact 76 connected to a wire 78. A wire 84 is connected to the wire 78 and the ignition circuit of the vehicle, not shown. The wire 78 is connected to one end of the relay coil 42. Hence, it is apparent that the relay coil 42 can only be energized when the ignition switch 72 is closed, and the relay coil 42 will be deenergized when the ignition switch 72 is open.

The other end of the relay coil 42 is connected to a wire 86. The wire 86 connects with a stationary contact 88 of a manual wiper control switch designated generally by the numeral 90. In addition to the stationary contact 88, the manual wiper control switch includes stationary contacts 92 and 94 and a movable bridging contact 96. The movable bridging contact 96 is connected to ground. The stationary contacts 92 and 94 are bridged by a resistor 98 which may be of 20 ohms. In addition, the stationary contact 92 is connected to a wire 100. Wire 100 is connected with the other end of the shunt field winding 20 as well as with one end of a resistor 102 which may be of 60 ohms. The other end of the resistor 102 is connected to ground. The wire 100 also connects with a wire 104 which is connected to a leaf spring 56. The leaf spring 62 is connected to ground.

Energization of the electrically operated wiper unit is controlled by the manual wiper switch 90. However, the wiper unit cannot be energized unless the ignition switch 72 is closed. When the ignition switch 72 is closed, the movable bridging contact 96 of the wiper control switch can be moved from the "off" position indicated in full lines to either the low, medium or high positions indicated by phantom lines. When the bridging contact 96 is in any of the "on" positions, the relay coil 42 is energized from the battery 24 through wire 26, ignition switch contact 74, contact 76, wire 78, relay coil 42, wire 86 and wiper control switch contacts 88 and 96. Accordingly, the armature 44 will move to the left thereby deflecting leaf spring 36 so as to engage contact 34 with contact 32 and simultaneously deflecting leaf spring 56 to disengage contacts 58 and 60.

When contacts 32 and 34 are in engagement, the motor 10 is energized from the battery 24 through wire 28, fuse 30, overload switch 22, wire 28, leaf spring 30, contacts 32 and 34, leaf spring 36, wire 38, the series field winding 18 and the armature 12. The shunt field winding 20 is energized from wire 38 directly to ground through wire 100 and contacts 92 and 96 of the wiper control switch 90 when the movable contact 96 is in the low speed position. In the medium speed position, the shunt field winding 20 is energized through wire 100, contact 92, resistor 98, and contacts 94 and 96 so as to reduce the current flow therethrough so as to increase the motor speed. When the manual wiper control switch is moved to the high speed position, the shunt field winding is energized at a further reduced value through resistor 102 so as to further increase the motor speed.

The wiper unit will continue to operate the wiper blades through their running strokes as long as the manual wiper control switch 90 is in the "on" position. When the movable bridging contact 96 is moved to the "off" position, as indicated in full lines in the drawing, the relay 42 will be deenergized. Moreover, when the manual wiper control switch is moved to the "off" position the motor 10 will be energized for low speed rotation since the shunt field winding 20 is fully energized from the battery 24 through the wire 100 and contacts 92 and 96 which are connected to ground. When the relay 42 is deenergized, the actuator bar 48 moves to the position shown in the drawing whereby contacts 58 and 60 will be in engagement. Contacts 58 and 60 merely connect the end of the shunt field winding 20 directly to ground, and hence do not have any real function when the manual wiper control switch is moved to the "off" position. Parking switch contacts 32 and 34 remain in engagement upon deenergization of relay coil 42, and hence the motor 10 continues to be energized for low speed rotation until the wiper blades arrive at the depressed parked position. When the wiper blades arrive at the depressed parked position the motor actuated latch arm 70 will engage the actuator 68 and deflect the leaf spring 30 so as to separate contacts 32 and 34. When contacts 32 and 34 are separated the motor 10 will be deenergized.

The aforedescribed operation comprises a normal sequence when the ignition switch 72 remains closed. However, assuming the manual wiper control switch 90 to be in an "on" position, the wiper will be automatically parked when the ignition switch 72 is opened. Thus, if the manual wiper control switch 90 is in the high speed position and the ignition switch 72 is opened, the relay coil 42 will be deenergized since ignition switch contact 74 is disengaged from stationary contact 76. When the relay coil 42 is deenergized, the actuator bar 48 is moved to the position shown in the drawing whereupon contacts 58 and 60 will be in engagement. Contacts 32 and 34 will remain in engagement until the wiper blades arrive at the depressed parked position. Engagement of contacts 58 and 60 results in full energization of the shunt field winding 20 from the battery through wire 104, leaf spring 56, contacts 58 and 60, and leaf spring 62. Thus, the motor will be energized for low speed rotation whenever the ignition switch 72 is opened irrespective of the selected speed position of the manual wiper control switch 90. This is essential since the actuating mechanism will only function to arrest the wiper blades in the depressed parked position during low speed rotation of the motor 10. When the wiper blade arrives at the depressed parked position, the motor operated latch 70 will engage the actuator 68 so as to deflect the leaf springs 30 to separate contacts 32 and 34 so as to deenergize the motor 10.

From the foregoing it is apparent that the present invention provides a control system for electrically operated vehicle wipers which will result in automatic parking of the wiper blades when either the manual wiper control switch or the ignition switch is opened. Moreover, while the disclosed embodiment is specifically related to the wiper mechanism disclosed in the aforementioned copending application Serial No. 718,789, this is only exemplary as the control means could obviously be used with other types of windshield wiper actuator mechanism including a control relay. Thus, for example, the control means of this invention would be used with wiper actuating mechanism of the type disclosed in copending application Serial No. 686,432 filed September 26, 1957, in the name of Harry W. Schmitz and assigned to the assignee of the present invention.

While the embodiment of the invention as herein disclosed constitutes a preferred form, it is to be understood that other forms might be adopted.

What is claimed is as follows:

1. Windshield wiper control mechanism including, an electric motor, an electric power source, an energizing circuit for said motor including a parking switch connected directly to said power source, the energizing circuit for said motor being completed when the parking switch is closed and interrupted when the parking switch is open, a relay for closing said parking switch, an energizing circuit for said relay including a power switch and a manual wiper control switch connected in series with said relay and said power source, and means driven by said electric motor for opening said parking switch to deenergize said motor at a predetermined wiper position when either of said serially connected switches is opened.

2. A control for a windshield wiper operable by an electric motor including, an electric power source, a relay, a relay controlled switch closed upon energization of said relay including a pair of contacts for completing an energizing circuit directly from said power source to said motor when said contacts are closed, said energizing circuit being interrupted to deenergize said motor when said contacts are open, a manually operable wiper switch connected with said power source and said relay and movable between open and closed circuit positions, a power switch connected in series with said power source and said relay and movable between open and closed circuit positions, a circuit completed when said wiper control and power switches are closed for energizing said relay whereby the contacts of said relay controlled switch will complete an energizing circuit for said motor, and means driven by said motor for opening said contacts at a predetermined wiper position upon deenergization of said relay due to opening of either the wiper control switch or the power switch.

3. A control for a windshield wiper operable by an electric motor, including, an electric power source, a control relay, a pair of contacts closed upon energization of said relay for completing an energizing circuit for said motor directly from said power source, the energizing circuit for said motor being interrupted when said pair of contacts are open, a power switch, a manual wiper control switch, means connecting said power and wiper control switches serially with said relay, and means operable by said motor for opening said pair of contacts to deenergize said motor at a predetermined wiper position when either said power switch or wiper control switch is opened.

4. A control for a windshield wiper operable by an electric motor including, an electric power source, a power switch, a manual wiper control switch movable between two circuit control positions and connected in series with said power switch, a circuit completed when said wiper control switch is closed for connecting said motor with said power source to effect energization thereof including a parking switch connected directly to said power source whereby said motor is energized when the parking switch is closed and deenergized when said parking switch is open, said circuit maintaining energization of said motor upon movement of said power switch to the open circuit position irrespective of the position of said wiper control switch, and means operated by said motor for opening said parking switch to deenergize said motor at a predetermined wiper position when said power switch is moved to the open circuit position.

5. A control for a windshield wiper operable by an electric motor including, an electric power source, a manual wiper control switch movable between open and closed circuit positions, an ignition switch connected in series with said wiper control switch and movable between open and closed circuit positions, a circuit completed upon movement of said wiper control and ignition switches to their closed circuit positions for energizing said motor including a parking switch directly connecting sad motor with said power source whereby said motor is energized when said parking switch is closed and deenergized when said parking switch is open, and means operated by said motor for opening said parking switch to deenergize said motor at a predetermined wiper position when said ignition switch or said wiper control switch is moved to the open circuit position.

6. A control for a windshield wiper operable by an electric motor including, an electric power source, an energizing circuit for said motor including a parking switch comprising a pair of spaced leaf spring contact members inherently biased towards each other and directly connected between said power source and said motor whereby said motor is energized when said parking switch is closed and deenergized when said parking switch is open, electromagnetic means operatively connected with one of said contact members for closing said parking switch when energized, an energizing circuit for said electromagnetic means including a power switch and a manual wiper control switch connected in series with said electromagnetic means and said power source, and means driven by said electric motor and engageable with the other leaf spring contact member to open said parking switch and deenergize said motor at a predetermined wiper position when either said power switch or said wiper control switch is opened.

7. A control for a windshield wiper operable by an electric motor including, an electric power source, an energizing circuit for said motor including a parking switch comprising a pair of leaf spring contact members inherently resiliently biased towards each other and directly connected between said power source and said motor whereby said motor is energized when said parking switch is closed and deenergized when said parking switch is open, a relay operatively connected to one of said leaf spring contact members for closing said parking switch when said relay is energized, a manual wiper control switch, a power switch, a circuit interconnecting said manual wiper control switch and said power switch with said relay and said power source whereby both said wiper control switch and said power switch must be closed to effect energization of said relay, and means operatively engageable with said other leaf spring contact member and driven by said motor for opening said parking switch at a predetermined wiper position to deenergize said motor when either said power switch or said wiper control switch is opened.

8. A control for a windshield wiper operable by an electric motor having an armature, a series field winding and a shunt field winding including, an electric power source, an energizing circuit for said motor including a parking switch and a low speed switch connected between said power source and said motor, a relay which, when energized, closes said parking switch and opens said low speed switch, an energizing circuit for said relay including a power switch and a wiper control switch connected between said relay and said power source, said power switch being movable between open and closed circuit positions, said wiper control switch having an open circuit position and a plurality of closed circuit positions for effecting motor operation at different speeds, and means driven by said motor for opening said parking switch at a predetermined wiper position upon movement of said power switch to the open circuit position irrespective of the position of said wiper control switch, said low speed switch automatically energizing said motor for low speed upon deenergization of said relay due to movement of said power switch to the open circuit position.

9. The control set forth in claim 8 wherein said low speed switch, when closed, connects one end of the shunt field winding to ground, and wherein said control includes resistor means, said manual wiper control switch being operable to connect said resistor means in series with said shunt field winding to vary motor speed.

10. The control set forth in claim 8 wherein said parking switch comprises a pair of spaced leaf spring contact members inherently resiliently biased towards each other, a first actuator operated by said relay having a lost motion connection with one of said contact members for moving it into engagement with the other contact member upon energization of said relay, and a second actuator rigidly connected to the other contact member and engageable with the means driven by said motor for opening said parking switch when the relay is deenergized and the wiper arrives at said predetermined position.

11. The control set forth in claim 10 wherein said low speed switch comprises a pair of spaced leaf spring contact members inherently resiliently biased towards each other, said first actuator having a lost motion connection with one of said leaf spring contact members of said low speed switch for opening said low speed switch when the relay is energized.

References Cited in the file of this patent
UNITED STATES PATENTS
2,364,603    Coxon et al. _____ Dec. 12, 1944